United States Patent [19]
Jespersen

[11] 3,790,230
[45] Feb. 5, 1974

[54] ALL-TERRAIN VEHICLE
[75] Inventor: Herbert A. Jespersen, Lincoln, Nebr.
[73] Assignee: Outboard Marine Corporation, Waukegan, Ill.
[22] Filed: Nov. 27, 1970
[21] Appl. No.: 93,474

Related U.S. Application Data
[62] Division of Ser. No. 857,494, Sept. 12, 1969, abandoned.

[52] U.S. Cl. .................................. 305/22, 305/27
[51] Int. Cl. ........................................... B62d 55/16
[58] Field of Search ............ 305/27, 25, 22, 35 EB; 180/9.2, 9.5, 9.54

[56] References Cited
UNITED STATES PATENTS
3,309,150   3/1967   Marier .................................. 305/27
3,362,492   1/1968   Hansen ............................. 305/27 X
1,539,582   5/1925   Landry ................................. 305/27
1,856,068   5/1932   Christie ............................ 305/22 X
3,017,942   1/1962   Gamaunt ......................... 180/9.2 R

*Primary Examiner*—Richard J. Johnson
*Attorney, Agent, or Firm*—Michael, Best & Friedrich

[57] ABSTRACT

Disclosed herein is an all-terrain vehicle including a track suspension system affording both transverse and lateral resiliently flexible support to an endless track and a releasably locked and pivotally mounted rear bogie wheel assembly which, when pivoted from its normal operating position, affords assembly of or removal of the endless track relative to the sprocket and bogie wheels.

7 Claims, 9 Drawing Figures

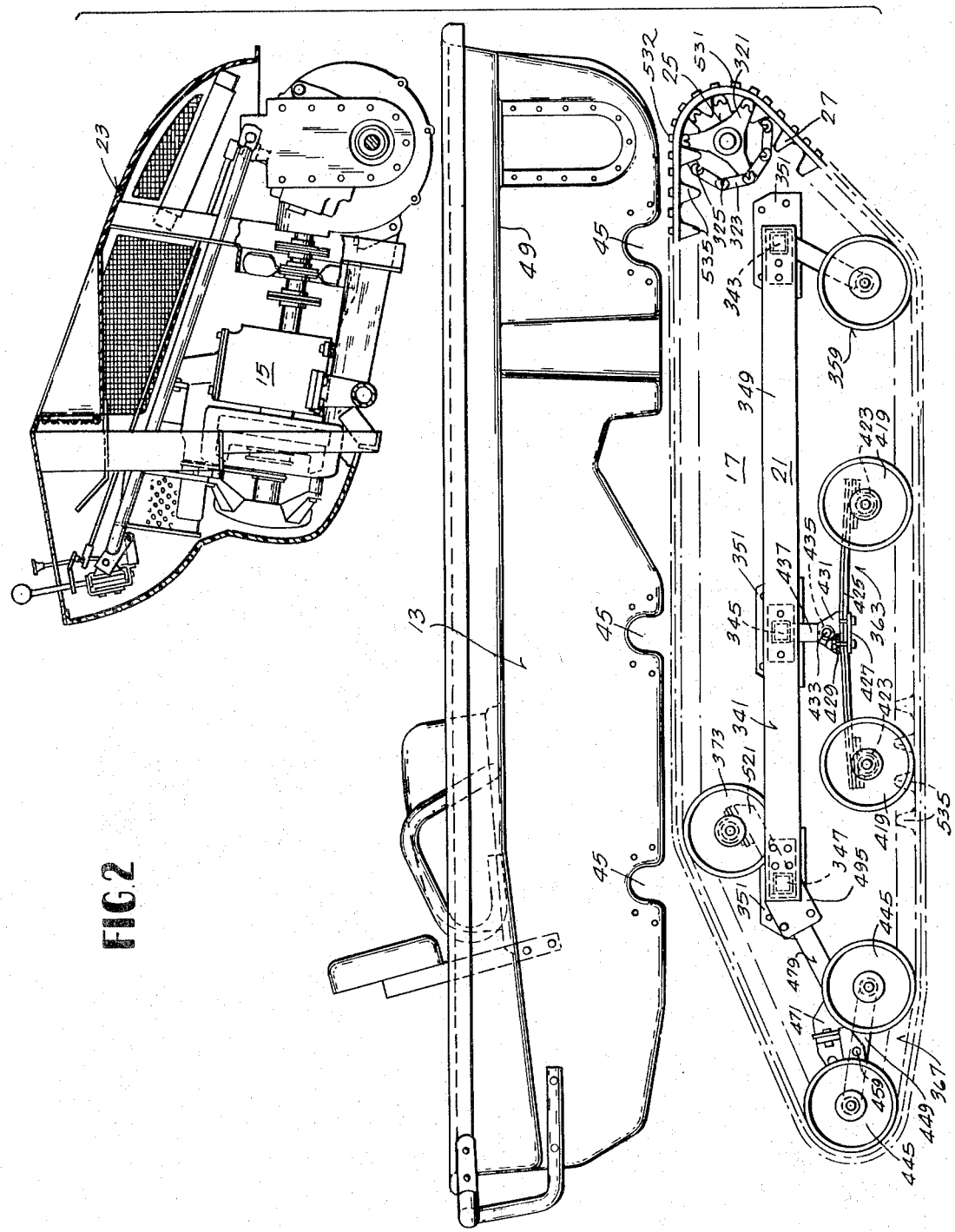

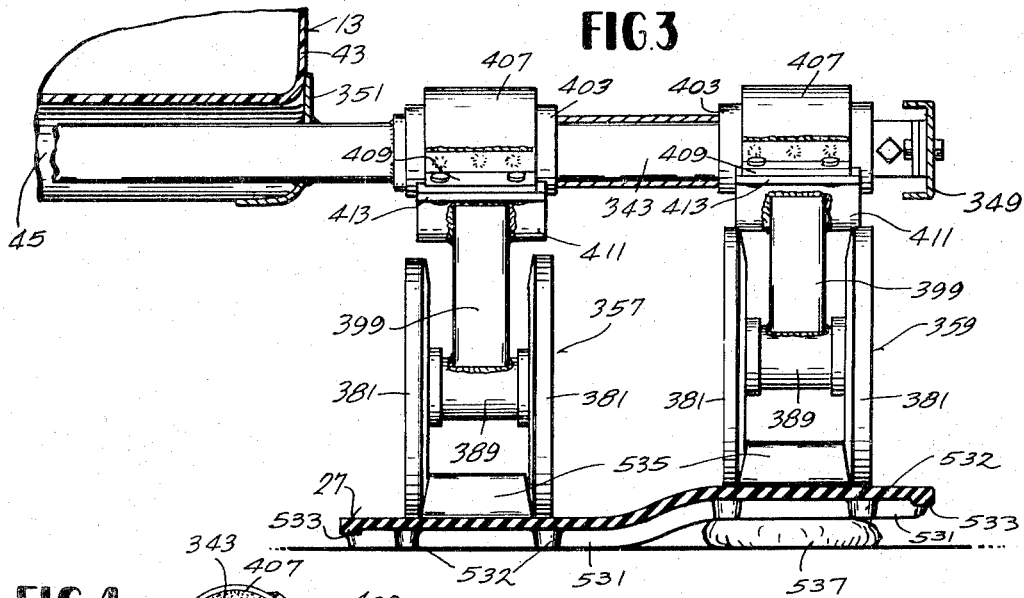
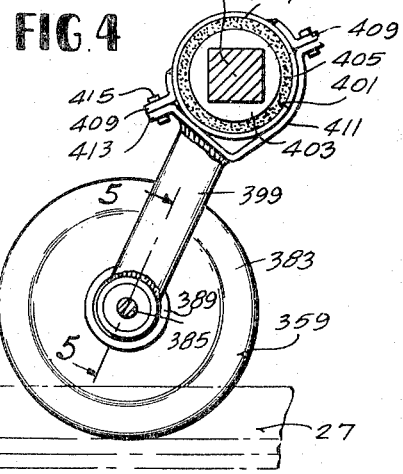
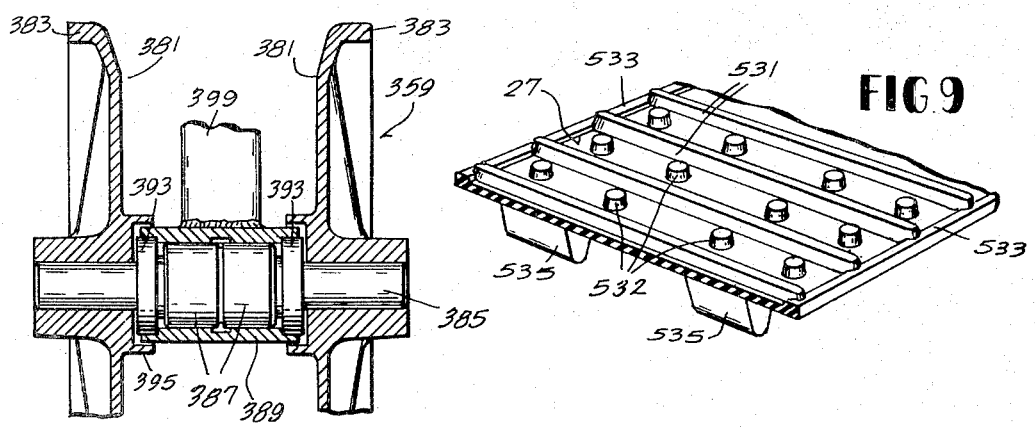

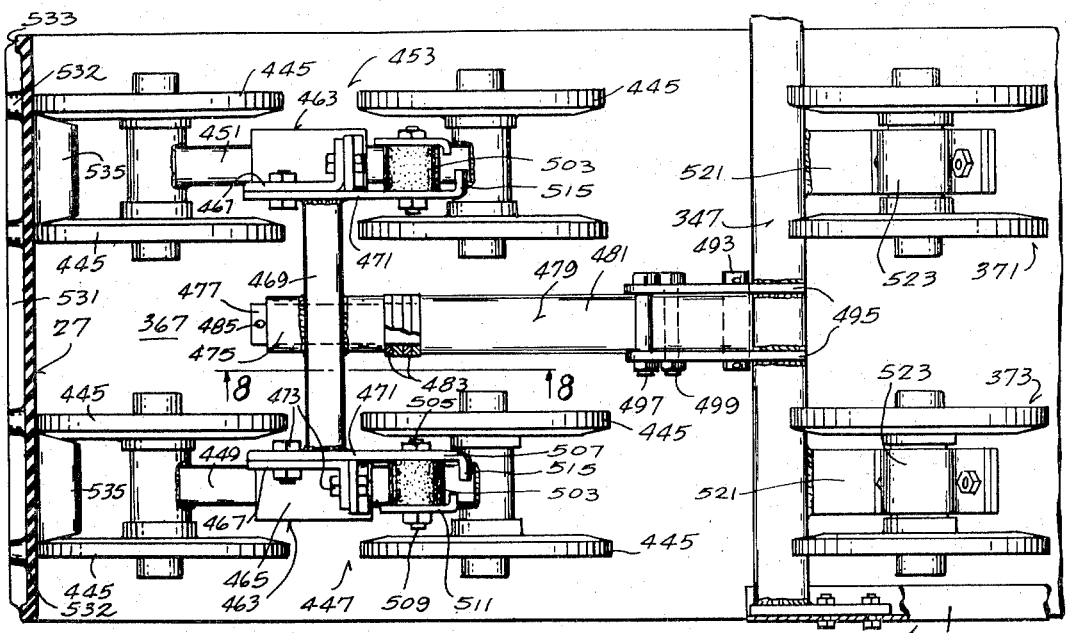
FIG.6
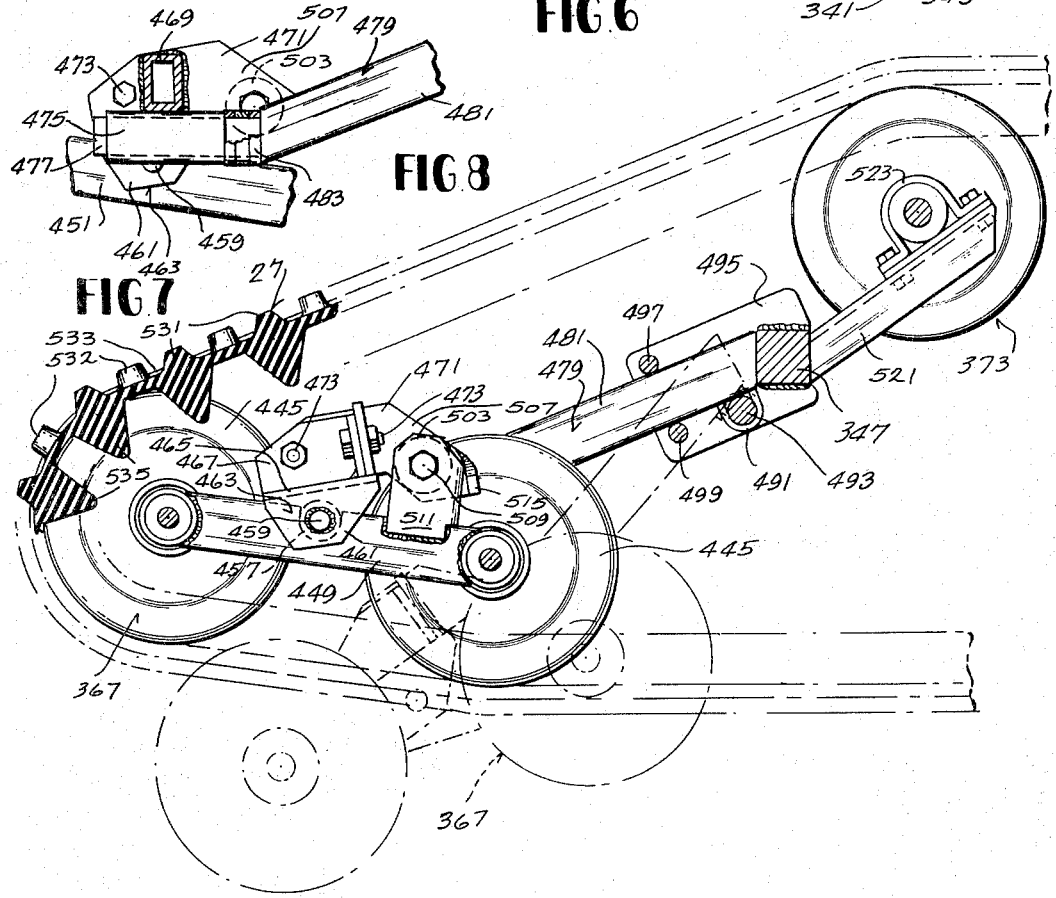
FIG.8
FIG.7

ALL-TERRAIN VEHICLE

RELATED CASE

This application is a division of my co-pending application Ser. No. 857,494, filed Sept. 12, 1969, and now abandoned.

BACKGROUND OF THE INVENTION

The invention relates to so-called all-terrain vehicles which have a high capability for travel over difficult and rough ground contours, conditions and textures. The invention also relates to track vehicles and especially to vehicles adapted to travel over snow and mud.

The invention further relates to sprocket constructions and to track suspensions. In connection with sprocket constructions, reference is made to U. S. application Ser. No. 685,214, now U.S. Pat. No. 3,542,623.

SUMMARY OF THE INVENTION

The invention provides a superior all-terrain vehicle capable of reliable performance over a wide range of ground conditions. One of the features of the invention resides in track suspension group whereby both lateral and longitudinal resilient support is provided for an endless belt or track. In this regard, the track suspension assembly, at each side of the vehicle body, incudes a plurality of paired inner and outer bogie wheels which are located in generally adjacent transverse relation to each other and which are supported for vertical movement independently of each other, whereby to afford resilient transverse flexible support for the endless belts.

In addition to the foregoing, each track assembly includes a rear bogie wheel assembly which is pivotally mounted to the supporting frame so as to afford displacement of the rear bogie wheels to a position conveniently affording placement of the endless track about the drive sprocket and around the bogie wheel assemblies. Upon such assembly, the rear bogie wheel assembly is swung back into its normal operating position and releasably locked in place to prevent loss of the endless track from the supsension assembly.

Another of the aspects of the rear bogie wheel construction is the arrangement for maintaining track tension, notwithstanding any stretch or elongation which may occur to the track.

Still another feature of the rear bogie wheel assembly is the arrangement of an elastomeric mount to afford limited resilient movement of the rear bogie wheels from their normal operating position.

Still another feature of the invention resides in the general arrangement of the various bogie wheels to the frame of the track suspension group and the arrangement for connection of the track suspension group to the body.

Still another feature of the invention resides in the relationship between the bogie wheel sprocket diameter and the lugs and the inside of the endless track. More specifically in this regard, the lugs and the discs are dimensioned such that, at least two teeth are always engaged within each bogie wheel during movement of the track, thereby reliably assuring retention of the track in proper aligned relation to the associated track suspension system.

In general, the principal object of the invention is to provide a superior all-terrain vehicle which is economical to manufacture and assemble, which can be readily repaired, and which is entirely reliable in operation.

Other objects and advantages of the invention will become known by reference to the following description and accompanying drawings in which:

DRAWINGS

FIG. 2 is an exploded elevational view, partially broken away in section, of the power generating and transmission group, the body, and the track suspension group of the vehicle shown in FIG. 1.

FIG. 3 is a front elevational view, partially in section, of the front bogie wheel assemblies incorporated in the track suspension group of the vehicle shown in FIG. 1.

FIG. 4 is a sectional view taken along line 4—4 of FIG. 3.

FIG. 5 is a sectional view taken along line 5—5 of FIG. 4.

FIG. 6 is a plan view, partially in section, of the rear bogie wheel assembly of the track suspension group.

FIG. 7 is an end elevational view, partially in section, of the rear bogie wheel assembly shown in FIG. 6.

FIG. 8 is a sectional view taken along line 8—8 of FIG. 6.

FIG. 9 is a fragmentary perspective view of a portion of the track employed on the vehicle shown in FIG. 1.

GENERAL DESCRIPTION

Figure 1:
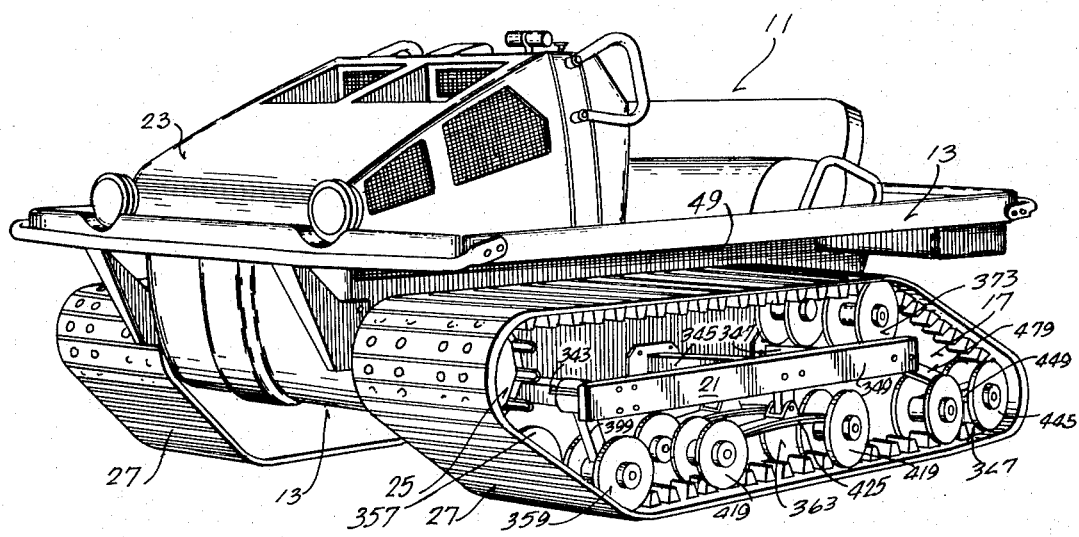
FIG. 1 is a perspective view of a track vehicle embodying various of the features of the invention.

Shown in the drawings and especially in FIG. 1, is an all-terrain vehicle 11 built in accordance with the invention. The vehicle is desirably constructed by assembling three main assemblies or modules (See FIG. 2), namely, a body 13, a power generating and transmission group 15, and a track suspension group 17 which includes, on each side of the vehicle, a track suspension system 21. In addition to the foregoing, full construction of the vehicle is generally completed by assembling a motor hood 23 over the power group and by connecting a pair of sprockets 25 to the power group and by training an endless longitudinal and transversely flexible track 27 around the sprocket 25 and track suspension system 21 at each side of the vehicle 11.

The track suspension group 17 can be assembled independently of the body 13 and the power generating and transmission group 15 and subsequently assembled to the body 13 independently of assembly of the power generating and transmission group 15 to the body 13. In accordance with the invention, the track suspension group 17 includes a frame or support 341 having a plurality of structural cross members which are respectively and individually located in the respective downwardly open channels 45 formed in the bottom of the body. While various arrangements are possible, in the disclosed construction (See the lower portion of FIG. 2), the frame 341 includes a forward cross member 343 and an intermediate cross member 345 and a rearward cross member 347.

The cross members 343, 345 and 347 are integrated into the frame 341 by longitudinal beams. While various arrangements can be employed, in the disclosed construction, two beams 349 are employed, which beams are respectively and suitably connected to the opposite ends of the cross members 343, 345 and 347.

If desired, the beams could be connected to the cross members inwardly of the ends thereof.

The track suspension group 17 is connected to the body 13 to maintain the body watertight and so as to locate the cross members 343, 345 and 347 in the downwardly open channels 45 by suitable means which are welded or otherwise fixed to the cross members and which are adapted to span the ends of the channels 45 and to contact and to be fixed to the exterior surface of the side margins around the channel ends.

Carried along each side of the track assembly frame 341 and under the adjacent deck wall 49 is a track suspension system. Each of the suspension systems includes inner and outer front bogie wheels 357 and 359 (See FIG. 3), intermediate inner and outer bogie wheel assemblies 363 (See bottom portion of FIG. 2), a rear bogie wheel assembly 367 and inner and outer rearward idler bogie wheels 371 and 373 (See FIG. 6). As each suspension system is identical, only one will be described.

Located at the front end of the track suspension frame 341 are the inner and outer first or front rotatable bogie wheels 357 and 359 which are separately supported in transversely adjacent and generally axially aligned relation to each other for rotational movement about their respective centers and for limited pivotal movement about the forward cross member 343. More particularly, the inner and outer bogie wheels 357 and 359 are generally of the same construction and, as shown best in FIG. 5, comprise a pair of transversely spaced discs 381 having a laterally outwardly extending thin peripheral lip 383. The discs 381 are keyed or otherwise fixed to a shaft having a central bearing 387 received in a sleeve 389 which includes, at each end, a counterbore receiving a seal member 393 which prevents entry of dirt or moisture into the bearing 387. In addition, each of the discs 381 is provided with a counterbored inwardly extending hub portion 395 which receives the end portions of the sleeve 389 to further assist in excluding dirt or moisture.

While various arrangements can be employed, in the disclosed construction, in order to permit lessening of shock upon contact of the track 27 with large obstacles and to ease passage of the vehicle over large obstacles, means are provided to support the front bogie wheels while, at the same time, affording resilient rearward swinging movement, thereby decreasing the angle of the upwardly and forwardly extending track to the ground.

As the arrangement for supporting each of the inner and outer front bogie wheels 357 and 359 is essentially the same, only the arrangement for supporting the outer front bogie wheel 359 will be described.

More particularly in the disclosed construction, as shown in FIGS. 3, 4 and 5, the outer front bogie wheel 359 is mounted for resilient swinging movement about the axis of the front cross member 343 by means including a generally vertically extending support bar 399 and a rubber torsion bushing assembly 401. Still more particularly, the torsion bushing assembly incudes an inner sleeve 403 which is telescoped onto the front cross member 343 into proper position and are suitably spaced and fixed thereto. The outer periphery of the sleeve is cylindrical and has bonded thereto a ring or annulus 405 of rubber or other rubber-like elastomeric material. Bonded to the outer cylindrical surface of the ring 405 is a cylindrical metallic jacket 407 having a pair of diametrically radially outwardly extending ears 409. The bushing assembly is received in an upwardly open cradle 411 which is welded or otherwise suitably connected to the upper end of the support bar 399 and which has a pair of diametrically extending tabs 413 which mate with the ears 409 and are suitably connected thereto, as by bolts or the like. At its lower end, the support bar 399 is welded to bogie wheel sleeve 389.

The extent of the resilient pivotal movement permitted to the front bogie wheels 357 and 359 is determined by the torsional resistance of the rubber ring 405.

Intermediate its ends, the track suspension system further includes intermediate inner and outer bogie wheel assemblies 363 each having rotatably mounted second and third bogie wheels 419 which are generally of the same construction as the front bogie wheels and which are arranged and supported such that the axes of the inner second and third bogie wheels are generally respectively laterally aligned with respect to the axes of the outer second and third bogie wheels.

As in the case of the front bogie wheels, the intermediate inner and outer bogie wheel assemblies 363 are separately supported. Each of the intermediate inner and outer bogie wheel assemblies 363 includes means for supporting the bogie wheels for resilient up and down movement and for pivotal movement about a transverse axis located intermediate the second and third bogie wheels. The construction of the intermediate inner and outer assemblies is generally the same.

To achieve the foregoing support, the sleeves of the outer bogie wheels are suitably connected, as by clamps 423, to the ends of a leaf spring 425 which, intermediate the ends thereof, is suitably fixed, as by a clamp 427, to the web 429 of an inverted U-shaped bracket 431 having upwardly extending legs supporting a fixed pivot 433. In turn, the fixed pivot 433 is received in a bushing or sleeve 435 which is located between the bracket legs and fixed to the lower end of a post 437 depending fixedly from the intermediate cross member 345.

While separate pivots have been provided for each of the intermediate inner and outer bogie wheels assemblies 363, a single pivot member could be employed to support both inner and outer bogie wheel assemblies and still provide the same functional result. Thus, the intermediate bogie wheel assemblies 363 have independent pivotal movement about an axis extending transversely between the second and third bogie wheels and, in addition, each of the bogie wheels is supported so as to afford resilient up and down movement relative to the other bogie wheel of each assembly, as well as rotative movement about its own axis.

Supported on the rear cross member 347 is the rear bogie wheel assembly 367 which includes fourth and fifth inner rotatable bogie wheels 445 and fourth and fifth outer rotatable bogie wheels 445 which are respectively located in transversely adjacent and axially aligned relation to the fourth and fifth inner bogie wheels. Each of the inner and outer fourth and fifth bogie wheels 445 is of like construction to the front bogie wheels. The fourth and fifth outer bogie wheels are integrated into an outer bogie wheel sub-assembly 447 by a strut or rocker bar 449 which is welded or otherwise fixed at its ends to the sleeves of the fourth and fifth outer bogie wheels. A similar rocker bar 451 is fixed so as to integrate the fourth and fifth inner bogie wheels into an inner sub-assembly 453.

In order to provide for independent movement of the inner and outer bogie wheel sub-assemblies 447 and 453 so as to provide both longitudinal and transverse flexiblity, the inner and outer bogie wheel sub-assemblies each include mounting means affording pivotal movement about aligned axes intermediate the foruth and fifth bogie wheels.

While various arrangements can be employed to separately afford pivotal movement for the inner and outer bogie wheel sub-assemblies 447 and 453, the arrangement for both bogie wheel sub-assemblies is the same. Only the arrangement at the outer bogie wheel assembly, as shown in FIG. 6, will be described in detail.

More particularly, the outer bogie wheel sub-assembly 447 has fixed thereto, as by welding or otherwise, a bushing or sleeve 457 which is located centrally of the associated bar 449 and which receives a pivot pin 459. In turn, the pivot pin 459 is fixed by welding or otherwise to the spaced downwardly extending legs 461 of a U-shaped bracket or connecting member 463 which straddles the sleeve 457 and which has a connecting web 465 located above the bar 449.

Also forming a part of the connecting bracket 463 is a right angle flange 467 which is welded or otherwise suitably fixed to the web 465 and which serves as a point of assembly to a cross bar or member 469 having welded, or otherwise suitably fixed to each end, a connecting plate or flange 471 which are respectively fixed, as by bolts 473, to the connecting brackets 463 associated with each of the inner and outer bogie wheel sub-assemblies 447 and 453.

Connected to the under-surface of the cross bar 469 for support thereof is a hollow tube 475 which is of rectangular cross-section and is telescoped on the rear end of a generally horizontal extending rear end portion 477 of an arm 479 which also includes a somewhat enlarged upwardly bent portion 481 connected to the rear cross member 347. Means are provided to maintain proper tension in the track. Various arrangements, including screw means can be employed. In the specifically disclosed construction, one or more shims 483 are located in telescopic relation on the rear end portion 477 of the arm 479 between the telescoping tube 475 and the upwardly inclined arm portion 481. As shown in FIG. 6, a cotter pin 485 can be employed adjacent to the rearward end of the rear end portion 477 to prevent disconnection of the telescoping tube 475 and the rearward end portion 477 of the arm 479.

In order to permit the endless tracks 27 to be slipped over the associated bogie wheels and sprockets, each raear bogie wheel assembly 367 is fixed to the rear cross member 347 so as to afford pivotal movement therebetween. While various means can be utilized to provide such pivotal construction, in the disclosed construction, the upper end of each arm 479 has fixed thereto, See FIG. 7, a bushing 491 which receives a pivot pin 493 extending between a pair of spaced parallel plates or brackets 495 suitably fixed, as by welding or otherwise, to the rear cross member 347 in adjacent outward relation to the opposed sides of the associated arm 479.

Means are provided to locate the arm 479 in proper angular relation to the rear cross member 347 and to releasably retain the arm 479 in such angular relation to the rear cross member 347. While various arrangements can be employed, in the disclosed construction, such means includes, at the rearward end of the plates 495, upper and lower bolts 497 and 499 which extend between the parallel plates above and below the arm 479 so as to confine the arm in proper angular relationship to the cross member 347. However, in order to swing the arm 479 downwardly, i.e., counterclockwise, as shown in FIG. 7, about the pivotal engagement on the pin 493, and to thereby facilitate slipping of the associated track over the sprocket and bogie wheels, the lower bolt 499 is removable.

Means are provided to establish a normal position for each of the rear bogie wheel sub-assemblies 447 and 453, to independently permit resilient pivotal movement of each subassembly relative to said normal position and to limit pivotal movement of each sub-assembly from the normal operating position. As the arrangement provided for each of the inner and outer bogie wheel assemblies 447 and 453 is generally identical, only the construction associated with the outer bogie wheel subassembly 447 will be described.

While various arrangements can be employed to establish a normal operating position and to afford resilient pivotal movement relative to said normal position, in the disclosed construction, an elastomeric or rubber mount or spring 503 is connected between the connecting flange 471 of the bogie wheel assembly cross bar 469 and the outer sub-assembly fore and aft bar 449. More particularly, the resilient mount 503 comprises a cylindrical body of rubber or other like material having imbeded therein separate threaded studs which extend from the opposite ends of the cylindrical body. One of said studs extends through and is bolted at 505 to a forward extension 507 of the connecting flange 471 at the adjacent end of the rear bogie wheel cross bar 469. The other stud extends through and is bolted at 509 to an upright bracket 511 which is welded or otherwise fixed to the outer fore and aft beam 449 of the outer sub-assembly 447.

Accordingly, each sub-assembly 447 and 453 tends to assume a normal position in which the rubber mount 503 is not under stress. However, the rubber mount 503 will deform in shear to offer resilient pivotal movement away from the normal position and to accommodate track flexure in conformance with ground conditions.

While other means can be employed, pivotal movement from the normal position in the counterclockwise direction, as shown in FIG. 7, is essentially prevented by engagement of the rear under-surface of the web 465 with the bogie sub-assembly fore and aft beam 449. Pivotal bogie sub-assembly movement in the clockwise direction from the neutral position is limited by engagemet of the sub-assembly fore and aft beam 449 with (See FIG. 6) a bent ear or tab 515 at the forward extremity of the connector flange extension 507 to which the rubber mount 503 is connected. Thus, each of the rear bogie wheel assemblies 367 includes inner and outer bogie wheel sub-assemblies 447 and 453 which provide flexible support to the track in both the longitudinal and transverse directions.

Also forming a part of each track suspension system are a pair of upper rearward inner and outer idler bogie wheels 371 and 373 which are constructed in generally the same manner as the front bogie wheels. Each of the rearward idler bogie wheels are respectively fixed (as shown best in FIGS. 6 and 7) by separate arms 521 which, at one end, are welded or otherwise suitably secured to the rear cross member 347 and, at the other end, are suitably fixed to the associated bogie wheels as by employment of respective clamps 523 encircling the respective bogie wheel sleeves.

It should be noted that, generally speaking, all of the inner bogie wheels are generally longitudinally aligned and that all of the outer bogie wheels are similarly longitudinally aligned.

The tracks 27 are of endless construction of rubber or other similar material and include, on the outer surface, longitudinally spaced transverse treads 531 (See FIGS. 3 and 9), as well as rows of transversely spaced studs or buttons 532 which are located intermediate the transverse treads 531. In addition, the outer surface of the tracks 27 is provided along both longitudinal edges with a rib or margin 533 which is raised to an extent less than the height of the treads 531 and the studs 532. On its inner surface, each track 27 includes a pair of longitudinally extending parallel series of lugs 535 which are engaged by the sprocket teeth 325 and extend within the spaced discs 381 of the bogie wheels.

It is especially noted that the studs 532 assist the margins 533 in preventing lateral slippage of the tracks in snow or mud or the like. In addition, the studs 532 are transversely located so as to be in longitudinal alignment with the outer edges or rims 383 of the bogie wheels. Thus, the studs 532 are located in laterally outwardly adjacent relation to the lugs 535 but on the opposite side of the track. Location of the studs 532 in alignment with the rims 383 of the bogie wheel discs 381 provides a smoother, quieter ride as the studs 532 prevent any tendency toward track flexure which might otherwise occur as a consequence of travel of the bogie wheels relative to flat ground.

In general, the tracks 27 are generally unbroken to obtain the greatest possible load supporting surface and are flexible in both the longitudinal and transverse direction. Such flexibility is illustrated in FIG. 3 wherein the right side of the track is shown passing over an object 537 which does not extend for the full width of the track.

In addition, it is noted that the diameter of the bogie wheel discs 381 is so related to the size or dimensions of the lugs 535 such that, at least portions of two lugs are transversely retained within he parallel discs 381 of each bogie wheel at all times, thereby assuring proper maintenance of the track on the track suspension system.

Various of the features of the invention are set forth in the following claims.

What is claimed is:

1. A track suspension comprising a support having, on each side thereof, an intermediate portion, front inner and outer bogie wheels, means separately mounting each of said front inner and outer bogie wheels from said support forwardly of said intermediate portion in adjacently spaced relation to each other transversely of the direction of intended travel for resilient pivotal movement about an axis transverse to the direction of intended travel and spaced from the center of said front inner and outer bogie wheels, second inner and outer bogie wheels, third inner and outer bogie wheels, means including a common member extending from said intermediate support portion for mounting said second and thrid inner bogie wheels in spaced relation to each other in the direction of intended travel and for independent vertical movement, means including another common member extending from said intermediate support portion for mounting said second and third outer bogie wheels in spaced relation to each other in the direction of intended travel and with said second and third outer bogie wheels being respectively located in adjacently spaced relation to said second and third inner bogie wheels transversely of the direction of intended travel and for independent vertical movement of said second and third outer bogie wheels relative to each other and to said second and third inner bogie wheels, fourth inner and outer bogie wheels, fifth inner and outer bogie wheels, and means mounting said fourth and fifth inner and outer bogie wheels from said support rearwardly of said intermediate portion with said fourth inner and outer bogie wheels in adjacently spaced relation to each other transversely of the direction of intended travel and with said fifth inner and outer bogie wheels in adjacently spaced relation to each other transversely of the direction of intended travel and for common pivotal movement of said outer fourth and fifth bogie wheels and common pivotal movement of said inner fourth and fifth bogie wheels independently of said outer fourth and fifth bogie wheels and about an axis spaced from said support.

2. A track suspension comprising a support, inner and outer front bogie wheels in adjacently spaced relation to each other transversely of the direction of intended travel, means separately connecting each of said inner and outer front bogie wheels to said support for limited resilient pivotal movement about an axis transverse to the direction of intended travel and spaced from the center of said inner and outer front bogie wheels, second inner and outer bogie wheels in adjacently spaced relation to each other transversely of the direction of intended travel, third inner and outer bogie wheels in adjacently spaced relation to each other transversely of the direction of intended travel, means including an outer leaf spring pivotally connected intermediate the ends thereof to said support and respectively connected at opposite ends to said second and third outer bogie wheels and an inner leaf spring pivotally connected intermediate the ends thereof to said support and respectively connected at the opposite ends thereof to said second and third inner bogie wheels for affording independent vertical movement of each of said second and third outer and inner bogie wheels, fourth inner and outer bogie wheels in adjacently spaced relation to each other transversely of the direction of intended travel, fifth inner and outer bogie wheels in adjacently spaced relation to each other transversely of the direction of intended travel, an outer rocker bar connected to said outer fourth and fifth bogie wheels, an inner rocker bar connected to said inner fourth and fifth bogie wheels, and means connecting said inner and outer rocker bars to said support for independent pivotal rocker bar movement about an axis spaced from said support and between said fourth and fifth bogie wheels and for adjustable positioning of said fourth and fifth bogie wheels along the direction of intended travel.

3. A track suspension in accordance with claim 2 wherein said means pivotally connecting said inner and outer rocker bars to said support includes an arm connected to said support for pivotal movement relative thereto and accompanying movement of said rocker bars and said fourth and fifth bogie wheels, and releasable means retaining said arm against pivotal movement.

4. A track suspension in accordance with claim 2 wherein said means connecting said inner and outer rocker bars to said support includes an elastomeric mount resiliently restraining pivotal movement between said support and said rocker bars.

5. A track suspension system including a frame, an arm including a first end portion connected to said frame for pivotal movement thereof relative to said frame and a second portion adjustable relative to said first portion to vary the length of said arm, means releasably restraining pivotal movement of said arm relative to said frame, inner and outer rocker bars adjacently spaced relative to each other transversely of the direction of intended travel, aligned pivot means connecting said rocker bars to said arm, and first and second inner bogie wheels connected to said inner bar on opposite sides of said pivot means and first and second outer bogie wheels connected to said outer bar on opposite sides of said pivot means.

6. A track suspension comprising a support, inner and outer front bogie wheels in adjacently spaced relation to each other transversely of the direction of intended travel, means connecting each of said inner and outer front bogie wheels to said support for pivotal movement about an axis transverse to the direction of intended travel, second inner and outer bogie wheels in adjacently spaced relation to each other transversely of the direction of intended travel, third inner and outer bogie wheels in adjacently spaced relation to each other transversely of the direction of intended travel, means including an outer leaf spring pivotally connected intermediate the ends thereof to said support and respectively connected at opposite ends to said second and third outer bogie wheels and an inner leaf spring pivotally connected intermediate the ends thereof to said support and respectively connected at the opposite ends thereof to said second and third inner bogie wheels for affording independent vertical movement of each of said second and third outer and inner bogie wheels, fourth inner and outer bogie wheels in adjacently spaced relation to each other transversely of the direction of intended travel, fifth inner and outer bogie wheels in adjacently spaced relation to each other transversely of the direction of intended travel, an outer rocker bar connected to said outer fourth and fifth bogie wheels, an inner rocker bar connected to said inner fourth and fifth bogie wheels, and means connecting said inner and outer rocker bars to said support for independent pivotal rocker bar movement about an axis spaced from said support and between said fourth and fifth bogie wheels.

7. A track suspension in accordance with claim 6 and further including means for adjustable positioning of said fourth and fifth bogie wheels along the direction of intended travel.

* * * * *